United States Patent [19]

Scott

[11] Patent Number: 4,625,080
[45] Date of Patent: Nov. 25, 1986

[54] REMOTE VIDEO RECORDER PROGRAMMING APPARATUS OPERATING OVER TELEPHONE LINES

[76] Inventor: Michael M. Scott, 965 New York Dr., Altadena, Calif. 91001

[21] Appl. No.: 491,086

[22] Filed: May 3, 1983

[51] Int. Cl.$^4$ .................... H04M 1/64; H04M 11/00; H04N 5/76
[52] U.S. Cl. .................... 379/104; 358/335; 360/33.1; 379/77; 379/98
[58] Field of Search .................... 179/2 A, 6.07, 6.11, 179/6.12, 2 R, 2 C; 358/335; 360/33.1

[56] References Cited

U.S. PATENT DOCUMENTS

| | | | |
|---|---|---|---|
| 3,903,369 | 9/1975 | Darwood | 179/6.11 X |
| 4,174,517 | 11/1979 | Mandel . | |
| 4,193,120 | 3/1980 | Yello | 369/7 |
| 4,348,669 | 9/1982 | Braun . | |
| 4,442,319 | 4/1984 | Treidl | 179/2 A |
| 4,469,919 | 9/1984 | Nakamura | 179/6.06 |
| 4,471,165 | 9/1984 | DeFino et al. | 179/2 A |
| 4,500,752 | 2/1985 | Lee | 179/6.11 X |
| 4,519,003 | 5/1985 | Scholz | 358/335 |
| 4,540,851 | 9/1985 | Hashimoto | 179/2 A |

OTHER PUBLICATIONS

Mar. 18, 1983—Los Angeles Times Atari Planning to Enter Home Phone Market by Bruce Keppel.

*Primary Examiner*—Raymond F. Cardillo
*Assistant Examiner*—Robert A. Weinhardt
*Attorney, Agent, or Firm*—Watts, Hoffmann, Fisher & Heinke Co.

[57] ABSTRACT

Apparatus for remote programming of an electronic device such as a video cassette recorder. A hand held portable programming unit stores intructions for the device as those instructions are entered through a key pad. These instructions are encoded into a form suitable for telecommunications to the device. A receiver unit which interfaces with the electric device receives the instructions and converts them into a form suitable for programming the device. When used in programming a video cassette recorder the instructions include the channel to be taped and the time and date the taping is to take place.

4 Claims, 3 Drawing Figures

REMOTE VIDEO RECORDER PROGRAMMING APPARATUS OPERATING OVER TELEPHONE LINES

TECHNICAL FIELD

The present invention relates to apparatus for programming a remote electronic device, such as a video recorder, for event queuing.

BACKGROUND ART

Recent advances in the electronics industry have been compared in their impact on society to the changes experienced during the industrial revolution. Advances in integrated circuit technology have spawned entire new industries and greatly enhanced the capabilities of existing products.

One specific integrated circuit, the microprocessor, has been particularly influencial in the electronics revolution. The microprocessor has replaced components and/or added new features to existing products. It has also made possible the personal computer, a product which has created a new multi-billion dollar industry in a short ten year time period.

Communication applications for the microprocessor and its peripheral supporting components have been dramatic. Electronic switching and transmitting circuitry has revolutionized the telecommunications industry. Networks of computers share data bases and computing capabilities. Within the recent past, computer based communications terminals have been used for commercial banking, information retrieval, and home entertainment.

Noncomputer communications products have been less swift in embracing sophisticated integrated circuit technology. Telephone answering and recording systems have become widely accepted as one consumer oriented product useful in the home. These systems are rather inflexible, however, in the way they store information. A typical recorder is actuated by a telephone call, records any communications received for a particular period, and then turns itself off.

U.S. Pat. No. 4,174,517, which issued on Nov. 13, 1979 to Mandel, proposes a communications system for use in the home. In accordance with the Mandel system, a central controller is coupled to one or more remote units through a house power distribution system. The Mandel system is no more than an on-off type control like the telephone answering system mentioned above. There is no capability, for example, to program operation of the remote units to cause them to automatically perform in a particular way without further input from the user.

DISCLOSURE OF THE INVENTION

The present invention concerns apparatus for programming a remote electronic device to avoid the necessity of on-site user intervention in operation of that device. The invention enables a user to program a sequence or series of operations into the device from a remote location.

The apparatus coordinates event queuing within the device. The user programs instructions into a transmitter unit that converts those instructions into signals suitable for transmission along a telecommunications path. At a remote location, a receiver converts the signals from the transmitter into control signals which are coupled to the electronic device. These signals instruct or program the device in a particular way and more particularly program events to be performed in a particular sequence.

The invention has particular applicability to a video recorder. In this embodiment the transmitter includes a mechanism for generating instructions to program the video recorder to turn itself on and off at specific times and to record programming on specific channels or stations.

A preferred embodiment of the input unit includes a visual display which prompts the user on what information needs to be entered for controlling the remotely located video recorder. Thus, the display will prompt the user to enter the time at which the recorder should be actuated, a time in which it is to be turned off, a station or channel to be recorded, and a prompt for transmitting these instructions to the receiver.

Both the transmitter and receiver are coupled to a transmission line, preferably a telephone transmission line via an interface for converting instructions into serial communication signals. At the transmit end a universal synchronous, asynchronous receiver/transmitter (USART) converts instructions entered by the user into serial signals which are coupled through a modem to the telephone line. At the receive end a second receiver/transmitter converts signals transmitted along the telephone line into instructions which are then interfaced with the video recorder.

The transmitter is a hand held unit and includes a speaker which can be placed in juxtaposition to a telephone handset mouthpiece after communications have been established with the receiver. At the receiving end of the communications a standard telephone answering system or machine answers the phone and establishes contact between a receiving modem and the remotely located transmitter.

From the above it should be appreciated that one aspect of the present invention is a system for remotely programming an electronic device having a clock to coordinate or control event queing by the device. Other objects, advantages and features of the invention will become better understood as a detailed description of a preferred embodiment of the invention is described in conjunction with the accompanying drawings.

BEST MODE FOR CARRYING OUT THE INVENTION

Figure 1:
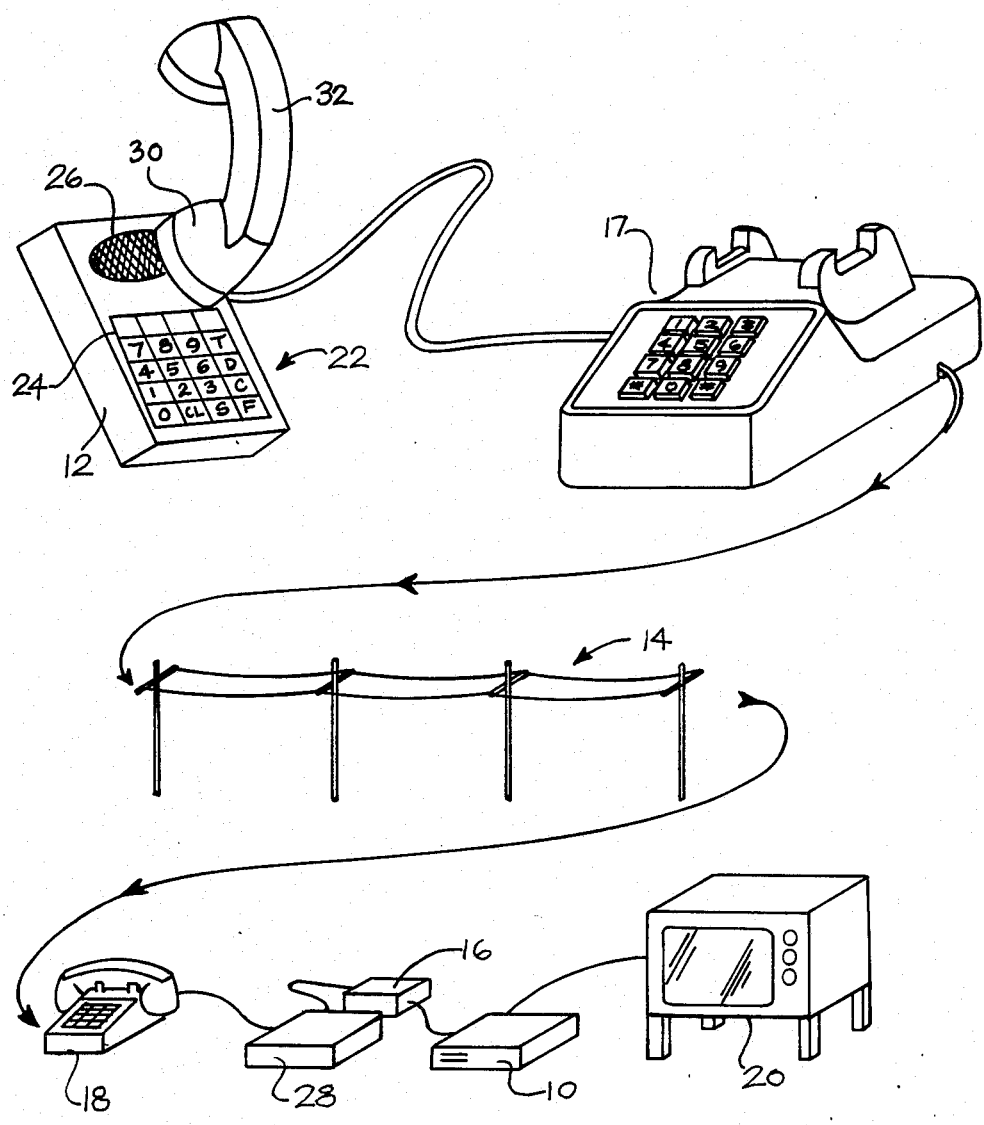
FIG. 1 is a schematic showing apparatus for programming a remotely positioned electronic device.

Turning now to the drawings and in particular to FIG. 1, there is illustrated an electronic device 10 and a remotely located programming unit 12 for that device. The programming unit 12 communicates with the electronic device 10 via a telecommunications path 14. In the preferred and disclosed embodiment, a telephone connection through two telephone units 17, 18 couples the programming unit 12 to a receiver 16 where instructions for the device 10 are stored.

In the disclosed embodiment of the invention, the electronic device 10 is a video recorder shown coupled to a television set 20. The programming unit 12 is used to automatically instruct the video recorder to record programming in a specific format. This programming typically includes a beginning and ending time for the recording session as well as what channel or station is to be recorded. These controls are available on a traditional video cassette recorder but, as far as applicant is aware, these instructions must, at present, be manually input by a user at the same location as the video recorder.

The disclosed programming unit 12 is a hand held portable unit having an input key pad 22 and a display 24 for visually prompting the user regarding the method of input as well as echoing the instructions as they are entered through the key pad 22. The programming unit 12 also includes a speaker 26 for transmitting audible signals corresponding to the instructions entered through the key pad 22.

Once the instructions have been entered through the key pad 22, the user dials the telephone number of the second telephone unit 18 and establishes communications contact with that second unit. Typically, this communications contact will be established by a telephone answering system 28 which answers the second telephone 18 without operator intervention. Once the user has established telephone contact he places a mouthpiece 30 of the first telephone 16 in close proximity to the speaker 26 and actuates a transmit button "T" on the key pad 22.

Actuation of the transmit button causes instructions stored inside the programming unit 12 to be transmitted through the speaker 26 along the telecommunications path 14 to the second telephone 18 and finally to the receiver 16 where they are stored. The receiver 16 interfaces with the recorder 10 and causes it to respond to the instructions as if it had been manually programmed by the user. Recording of television programming is automatically initiated at designated times and on designated channels for designated time periods.

Figure 2:
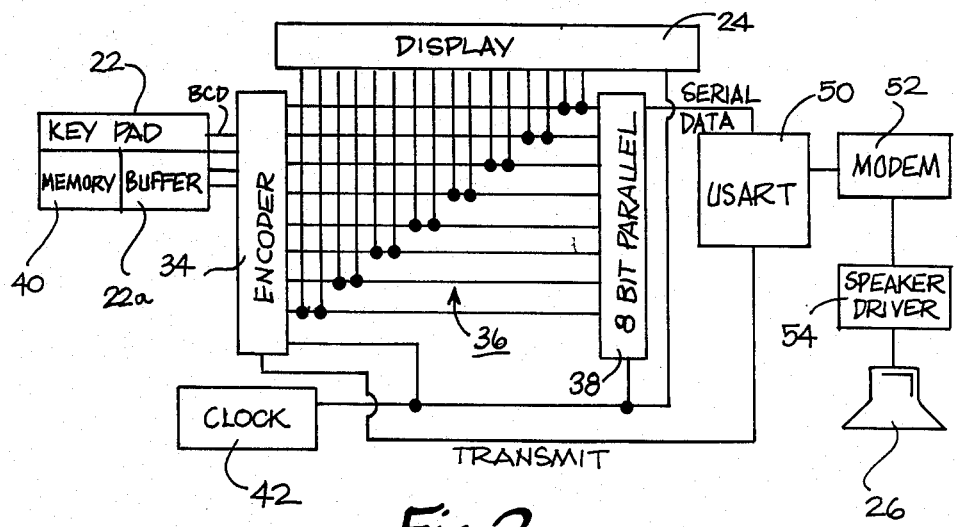
FIG. 2 is an electrical schematic of a programming unit that generates instructions for said remotely positioned device.
Figure 3:
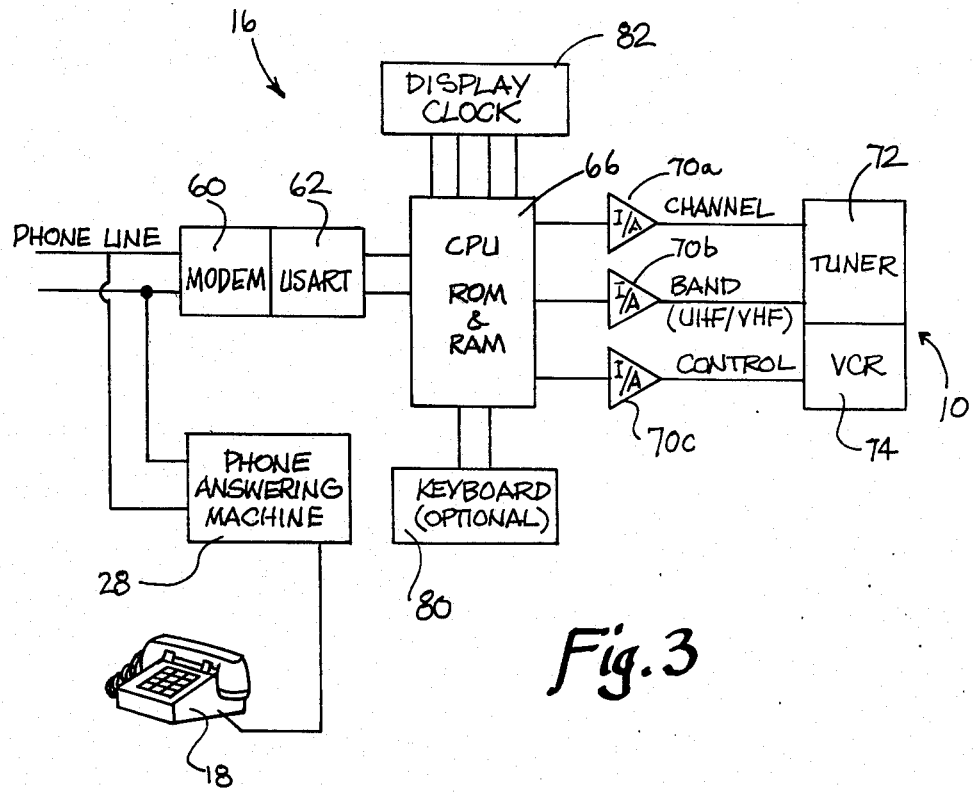
FIG. 3 is an electrical schematic of a receiving unit for receiving instructions from the programming unit and controlling operation of the remotely positioned electronic device.

Circuitry for implementing the present invention is disclosed in the electrical schematics of FIGS. 2 and 3. Circuitry comprising the programming unit 12 is illustrated in FIG. 2 and circuitry comprising the receiver 16 is shown in FIG. 3. As the user enters instructions through the key pad 22 those instructions are simultaneously stored in a key pad buffer 22a and transmitted to an encoder 34 in Binary Code Decimal format. The four bit BCD signal is translated by the encoder 34 into an eight bit ascii representation of the key pad input and transmitted to a programming unit data bus 36. The data bus 36 is coupled to the display 24 so that as the instructions are input on the key pad 22 they are echoed on the display 24.

In addition to the buffer 22a, the key pad 22 includes a memory unit 40 for storing a display algorithm which prompts the user into procedures for entering the data through the key pad. Thus, during the programming mode of operation, the display prompts the user how to enter commands, stores those commands and indicates to the user how the commands have been entered.

A number of programming buttons or keys on the key pad 22 correspond to the programming instructions on a video recorder. A function key "F" allows the user to cycle through a trio of functions known as "clock", "clock set" and "program". In the "clock" mode the display 24 displays the present time as indicated by an internal clock 42 coupled to the display. In the "clock set" mode the time of the clock 42 is set by the user. Finally, in the "program" mode instructions are entered and stored in the buffer 22a.

In the program mode the display 24 prompts the user by displaying a day of the week, and the user chooses a day by cycling through the days of the week with a set button "S". When the day for which recording is desired is shown on the screen, the user enters this information by depressing the choice key "C". In an analogous fashion, the user enters the on time, off time and channel selection by use of the select and choice keys. By actuation of a clear button "CL" on the keyboard 22, the user can reprogram the unit 12 as many times as desired prior to transmission of the instructions along the telecommunications path 14.

Once the transmit key is actuated the instructions stored in the buffer 22a are transmitted through the encoder 34 to the data bus 36 and to a parallel-to-serial converter 38. The parallel-to-serial shift register 38 converts the parallel ascii signals into serial ascii signals. Serial ascii signals are then transmitted to a universal synchronous, asynchronous receiver transmitter (USART) 50. The USART 50 responds to a transmit signal from the encoder 34 and converts the serial ascii representations into a form suitable for telecommunications transmission. An output from the USART is coupled to a modem 52, speaker driver 54 and ultimately the speaker 26. In a transmit mode the modem converts digital signals from the USART into a series of audible tones of one of two frequencies. One frequency corresponds to a logical "0" and the other to a logical "1".

These sounds are transmitted by the telephone 17 to the second telephone 18 and stored in the receiver 16. The receiver 16 includes a modem 60 (FIG. 3) to couple the incomming sounds to a USART 62 connected to an input port 64 on a processing unit 66. The processing unit 66 includes a read/write storage portion for storing instructions from the programming unit 12 as well as a "read only" memory section that stores an operating system that controls the storing of data from the USART 62. A preferred processing unit 66 comprises a microprocessor and peripheral integrated circuits, the number and function of which vary with the choice of microprocessor. A preferred microprocessor is an Intel 8085 eight bit microprocessor.

As noted above, the information input into the processing unit 66 includes information concerning which channel is to be recorded and at what times (day, hour, minute) the recording is to occur. The operating system within the central processing unit 66 continually monitors the storage locations where this information is stored to determine whether the cassette recorder 10 is to be actuated and if so, which stations are to be recorded.

The operating system and/or central processing unit 66 includes a clock which is continually monitored to determine whether the starting or stopping time of a recording operation is at hand. This clock can be provided in hardware or in software by the central processing unit. When hardware implemented the processing unit 66 has a special integrated circuit that generates a time signal which interrupts the microprocessor with each passing second. When implemented in software the operating system performs the clock function by counting pulses generated by the microprocessor. A preferred clock is software generated.

One of the peripheral circuits to the processing unit 66 defines a receiver output port coupled to three interface amplifiers 70a 70b, 70c. These amplifiers are in turn coupled to a tuner 72 and recorder unit 74. Two amplifiers 70a, 70b are coupled to the tuner 72. These outputs control channel selection and band selection respectively and correspond to the instructions regarding these parameters generated at the programming unit 12. A third amplifier 70c turns the recording unit 74 on and off at appropriate times as controlled by the processing unit's operating system.

As an alternate embodiment of the invention the control unit 66 uses an internal clock of the recorder 74 to start and stop recording. In this alternate embodiment of the invention, the amplifier 70c transmits serial communications to the recorder 74 indicating the start and stop times for the recording session. When a match occurs between these times and the times on the recorder clock, the appropriate action occurs.

As illustrated in FIG. 3, an optional keyboard unit 80 is coupled to the central processing unit 66 to transmit instructions in a format identical to the instructions coming from the second USART 62. This keyboard 80 enables a user to program the recording unit 74 in the same format used in the programming unit 12. In this embodiment, the recorder 10 includes a display 82 which prompts the user as well as echoing the user instructions as they are entered to the keyboard 80.

The present invention has been described with a degree of particularity. It should be appreciated, however, that certain design modifications or alterations could be made without departing from the spirit or scope of the invention as defined by the appended claims.

I claim:

1. Apparatus for programming a video recorder comprising:
    a programming unit locatable at a position remote from the video recorder, said programming unit including a keyboard for entering programming instructions, said instructions including a start time, a stop time and station whose program content is to be recorded by the video recorder, a visual display for prompting a user to enter said keyboard instructions and for displaying said instructions as they are entered, a memory device for storing digital signals corresponding to said instructions as they are input through said keyboard, a communications device for converting said digital signals corresponding to said instructions into serial signals suitable for telephone transmission, a transmit control for causing instructions stored in the memory means to be converted into said serial signals, and speaker means for converting said serial signals into audible tones suitable for transmission by a telephone system; and
    a receiver unit, said receiver unit having means couplable to the telephone system for receiving said, audible tones, means for converting said audible tones into formated signals suitable for storage, means for storing said formated signals, processor means coupled to said means for storing and having means for interpreting said formated signals and converting them into video recording control signals, and interface means responsive to the processor means and couplable to a video recorder for controlling said recorder in accordance with said instructions by turning on said video recorder at the start time, turning off said video recorder at the stop time and tuning the recorder to an appropriate station.

2. The programming apparatus of claim 1 which additionally comprises a keyboard unit couplable to said means for storing to directly enter programming instructions without a telephone transmission from a transmitter unit.

3. A hand held, portable unit for programming a remotely located video recorder via a telephone communications path between said unit and said video recorder comprising:
    a key pad input having a number of individually actuable alphanumeric keys through which a user enters programming instructions including on and off times for the video recorder and stations to be recorded when the video recorder is turned on;
    means integral with said hand held unit for prompting the user to enter said instructions into said key pad and for displaying those instructions as they are entered;
    memory means integral with said hand held unit for digitally storing said instructions as a user enters said instructions through the key pad;
    encoder means for converting said digitally stored instructions into serial signals suitable for transmission to a remotely located video recorder;
    transmit means for activating said encoder means and thereby initiate an instruction transfer; and
    means for communicating said serial signal to a telephone communication path to transmit said signals to said remotely located video recorder.

4. The programming unit of claim 3 wherein said means for communicating comprises a modem, speaker driver, and speaker which can be placed next to a mouthpiece of a telephone handset.

* * * * *